United States Patent
Yoon et al.

(10) Patent No.: US 11,935,440 B2
(45) Date of Patent: Mar. 19, 2024

(54) DISPLAY APPARATUS AND HINGE ASSEMBLY OF DISPLAY MODULE

(71) Applicant: SAMSUNG ELECTRONICS CO., LTD., Suwon-si (KR)

(72) Inventors: Sang Ki Yoon, Suwon-si (KR); Kwang Sung Hwang, Suwon-si (KR); Nguyen Huu Lam Vuong, Suwon-si (KR); Sang Goo Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 926 days.

(21) Appl. No.: 16/960,164

(22) PCT Filed: Dec. 28, 2018

(86) PCT No.: PCT/KR2018/016866
§ 371 (c)(1),
(2) Date: Jul. 6, 2020

(87) PCT Pub. No.: WO2019/135562
PCT Pub. Date: Jul. 11, 2019

(65) Prior Publication Data
US 2020/0357311 A1    Nov. 12, 2020

(30) Foreign Application Priority Data

Jan. 4, 2018   (KR) .......................... 10-2018-0001366

(51) Int. Cl.
*G06F 1/16* (2006.01)
*F16M 11/08* (2006.01)
(Continued)

(52) U.S. Cl.
CPC ........... *G09F 9/3026* (2013.01); *F16M 11/08* (2013.01); *G06F 1/181* (2013.01); *G09F 9/301* (2013.01)

(58) Field of Classification Search
CPC ..... G06F 1/1681; G09F 9/3023; G09F 9/3026
See application file for complete search history.

(56) References Cited

U.S. PATENT DOCUMENTS

2009/0309494 A1* 12/2009 Patterson .............. G09F 9/3026
445/24
2009/0310337 A1* 12/2009 Patterson .............. F21V 21/088
445/24
(Continued)

FOREIGN PATENT DOCUMENTS

KR    10-0956588    5/2010
KR    10-1276916    6/2013
(Continued)

OTHER PUBLICATIONS

Korean Office Action dated Apr. 27, 2022 from Korean Application No. 10-2018-0001366.
(Continued)

*Primary Examiner* — Anthony Q Edwards
(74) *Attorney, Agent, or Firm* — STAAS & HALSEY LLP

(57) ABSTRACT

The present disclosure relates to a display apparatus including a plurality of display modules, and a hinge assembly connecting the plurality of display modules, wherein the hinge assembly comprises a pair of brackets rotatably coupled to each other to adjust an angle between the plurality of display modules, a moving block is mounted on each of the pair of brackets to be coupled to the display module, and the moving block is configured to slidingly move with respect to the bracket to adjust a spacing between the plurality of display modules. With this structure, the angle between the plurality of display modules may be variously varied according to an installation environment.

17 Claims, 14 Drawing Sheets

(51) Int. Cl.
  *G06F 1/18* (2006.01)
  *G09F 9/30* (2006.01)
  *G09F 9/302* (2006.01)

(56) References Cited

U.S. PATENT DOCUMENTS

| | | | | |
|---|---|---|---|---|
| 2011/0298692 A1* | 12/2011 | De Loore | ................. | G09F 9/33 |
| | | | | 345/1.3 |
| 2015/0192952 A1* | 7/2015 | Jung | ..................... | G06F 1/1601 |
| | | | | 361/747 |
| 2016/0231976 A1* | 8/2016 | Ryu | ..................... | G06F 3/1446 |
| 2017/0303408 A1* | 10/2017 | Lee | ..................... | H05K 5/0021 |
| 2018/0220537 A1* | 8/2018 | Heo | ..................... | G06F 3/1446 |
| 2019/0179592 A1* | 6/2019 | Hyeon | ................... | G09G 3/006 |

FOREIGN PATENT DOCUMENTS

| | | |
|---|---|---|
| KR | 10-2015-0006633 | 1/2015 |
| KR | 10-2015-0011581 | 2/2015 |
| KR | 10-2017-0072399 | 6/2017 |

OTHER PUBLICATIONS

International Search Report dated Apr. 17, 2019 from International Application No. PCT/KR2018/016866, 5 pages.

* cited by examiner

DISPLAY APPARATUS AND HINGE ASSEMBLY OF DISPLAY MODULE

CROSS-REFERENCE TO RELATED APPLICATIONS

This application is a U.S. National Stage Application which claims the benefit under 35 U.S.C. § 371 of International Patent Application No. PCT/KR2018/016866 filed on Dec. 28, 2018, which claims foreign priority benefit under 35 U.S.C. § 119 of Korean Patent Application No. 10-2018-0001366 filed on Jan. 4, 2018 in the Korean Intellectual Property Office, the contents of each of which are incorporated herein by reference.

TECHNICAL FIELD

The present disclosure relates to a display apparatus composed of a plurality of display modules, and more particularly, to a hinge assembly connecting a plurality of display modules and a display apparatus including the same.

BACKGROUND ART

A display apparatus is an apparatus that converts and displays electrical information into visual information. The display apparatus includes a self-light emitting display panel that emits light itself, such as an LED panel (Light Emitting Diode Panel), or includes a light-receiving/emitting display panel that does not emit light itself and needs to be supplied with light from a backlight unit, such as a liquid crystal panel.

When producing a large-sized display apparatus, a modular display technology in which a large-sized screen is produced by continuously tiling a small-sized display panel vertically and horizontally may be utilized. Furthermore, a larger sized screen may be provided by connecting a plurality of the display modules produced by tiling a small sized display panel.

In this case, a curved screen may be implemented by changing an angle between a plurality of the display modules as needed.

DISCLOSURE

Technical Problem

The present disclosure is directed to providing a display apparatus in which a curved screen may be implemented by connecting a plurality of display modules having a flat screen.

The present disclosure is directed to providing a display apparatus in which a curvature of a curved screen may be varied by changing an angle between a plurality of display modules.

The present disclosure is directed to providing a display apparatus in which a connected screen may be formed in both concave and convex shapes.

The present disclosure is directed to providing a display apparatus in which a plurality of display modules may slidingly move such that a gap is not generated between the plurality of display modules when an angle between the plurality of display modules is changed.

Technical Solution

One aspect of the present disclosure provides a display apparatus including a plurality of display modules, and a hinge assembly connecting the plurality of display modules, wherein the hinge assembly includes a pair of brackets rotatably coupled to each other to adjust an angle between the plurality of display modules, a moving block is mounted on each of the pair of brackets to be coupled to the display module, and the moving block is configured to slidingly move with respect to the bracket to adjust a spacing between the plurality of display modules.

The hinge assembly may further include a hinge pin to rotatably couple the pair of brackets.

The hinge assembly may further include a spacing adjustment member to adjust a position of the moving block.

The spacing adjustment member may include a screw screwed to the moving block, and the moving block may slidingly move when the screw rotates.

The hinge assembly may further include a separation preventing nut coupled to the screw to prevent the screw from being separated.

The bracket may include a mounting portion on which the moving block is mounted to slidingly move.

The mounting portion may have one side open to allow the moving block to enter thereinto.

The hinge assembly may further include a cover coupled to the bracket to cover the open side of the mounting portion.

The hinge assembly may further include a coupling member to couple the moving block to the display module.

The bracket may include a long hole extending along a moving direction of the moving block to allow the coupling member to penetrate.

The bracket may include a guide protrusion to guide the movement of the moving block.

The pair of brackets may be rotatable so that an angle between screens of the plurality of display modules is less than 180 degrees.

When the pair of brackets are rotated so that an angle between screens of the plurality of display modules is less than 180 degrees, the moving block may move in a direction of getting away from a rotation axis of the pair of brackets.

The pair of brackets may be rotatable so that an angle between screens of the plurality of display modules is more than 180 degrees.

When the pair of brackets are rotated so that an angle between screens of the plurality of display modules is more than 180 degrees, the moving block may move in a direction of getting close to a rotation axis of the pair of brackets.

Another aspect of the present disclosure provides a display apparatus including a plurality of display modules, and a hinge assembly connecting the plurality of display modules, wherein the hinge assembly includes a first bracket, a second bracket rotatably coupled to the first bracket, a first moving block coupled to a first display module among the plurality of display modules and mounted on the first bracket to be slidingly movable, and a first moving block coupled to a second display module adjacent to the first display module among the plurality of display modules and mounted on the second bracket to be slidingly movable.

The hinge assembly may be rotatable between a reference position in which a screen of the first display module and a screen of the second display module are parallel, a concave position in which an angle between the screen of the first display module and the screen of the second display module is less than 180 degrees, and a convex position in which the angle between the screen of the first display module and the screen of the second display module is more than 180 degrees.

In the concave position, the first moving block and the second moving block may move in a direction of getting further away from each other than the reference position.

In the convex position, the first moving block and the second moving block may move in a direction of getting closer to each other than the reference position.

Another aspect of the present disclosure provides a hinge assembly, which to connect a plurality of display modules, including a pair of brackets rotatably coupled to each other to adjust an angle between the plurality of display modules, wherein a moving block coupled to the display module is mounted on each of the pair of brackets, and the moving block is configured to be slidingly movable with respect to the bracket to adjust a spacing between the plurality of display modules.

Advantageous Effects

According to the disclosed display apparatus, an angle between a plurality of display modules can be variously varied according to an installation environment of the display apparatus.

Further, a gap between the plurality of display modules generated according to the angle between the plurality of display modules can be eliminated by slidingly moving the plurality of display modules when adjusting the angle between the plurality of display modules.

MODE OF THE DISCLOSURE

Figure 1:
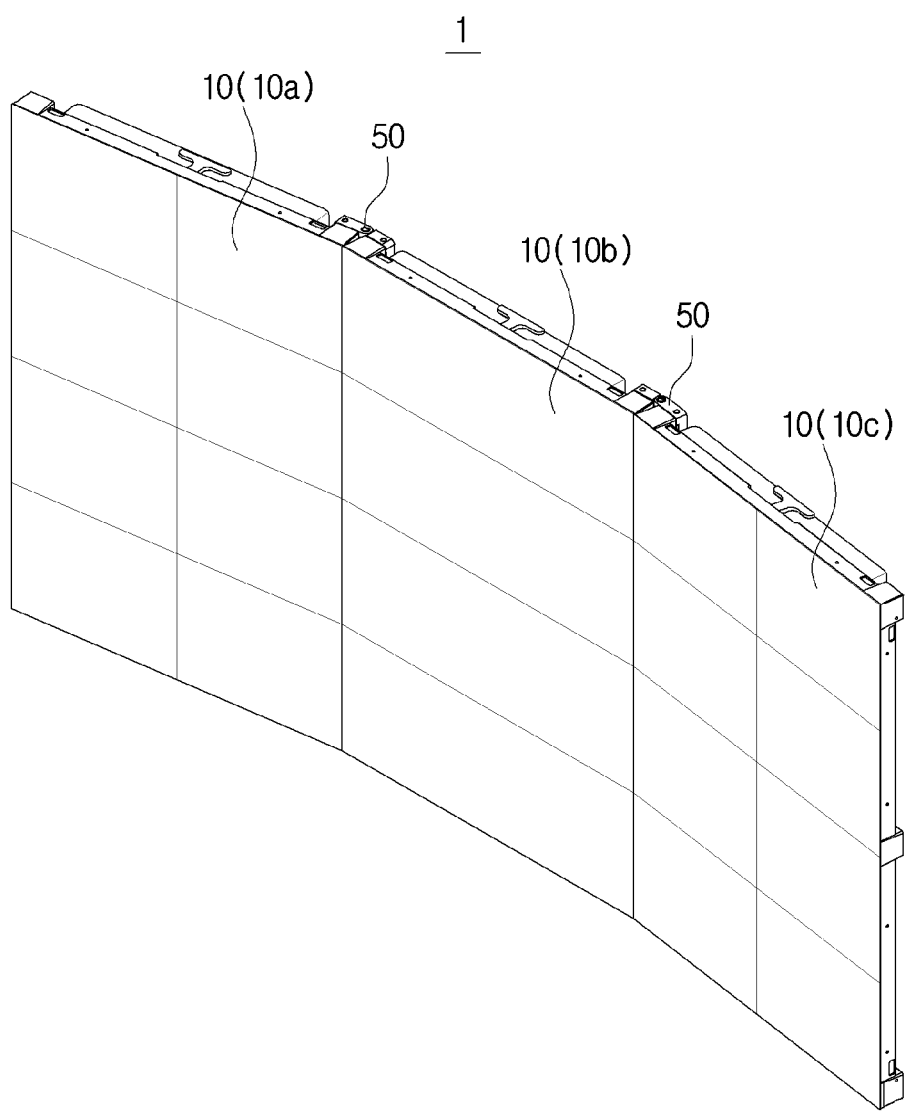
FIG. 1 is a perspective view illustrating an outer appearance of a display apparatus according to an embodiment of the present disclosure.

The embodiments described in the present specification and the configurations shown in the drawings are only examples of preferred embodiments of the present disclosure, and various modifications may be made at the time of filing of the present disclosure to replace the embodiments and drawings of the present specification.

Singular expressions used in the description may include plural expressions, unless the context clearly dictates otherwise. The shape and size of elements in the drawings may be exaggerated for clarity. Like reference numbers or signs in the various drawings of the application represent parts or components that perform substantially the same functions.

The terms "comprises" and "has" are intended to indicate that there are features, numbers, steps, operations, elements, parts, or combinations thereof described in the specification, and do not exclude the presence or addition of one or more other features, numbers, steps, operations, elements, parts, or combinations thereof.

It will be understood that, although the terms first, second, etc. may be used herein to describe various components, these components should not be limited by these terms.

Hereinafter, embodiments of the present disclosure will be described in detail with reference to the accompanying drawings.

Figure 2:
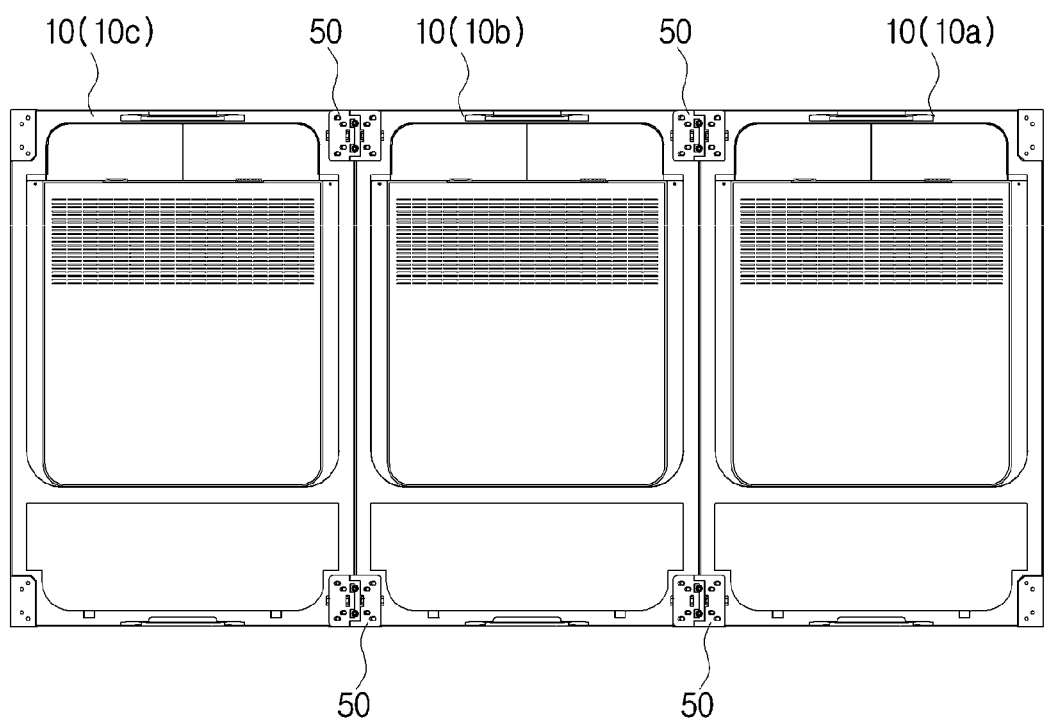
FIG. 2 is a rear view of the display apparatus in FIG. 1.
Figure 3:
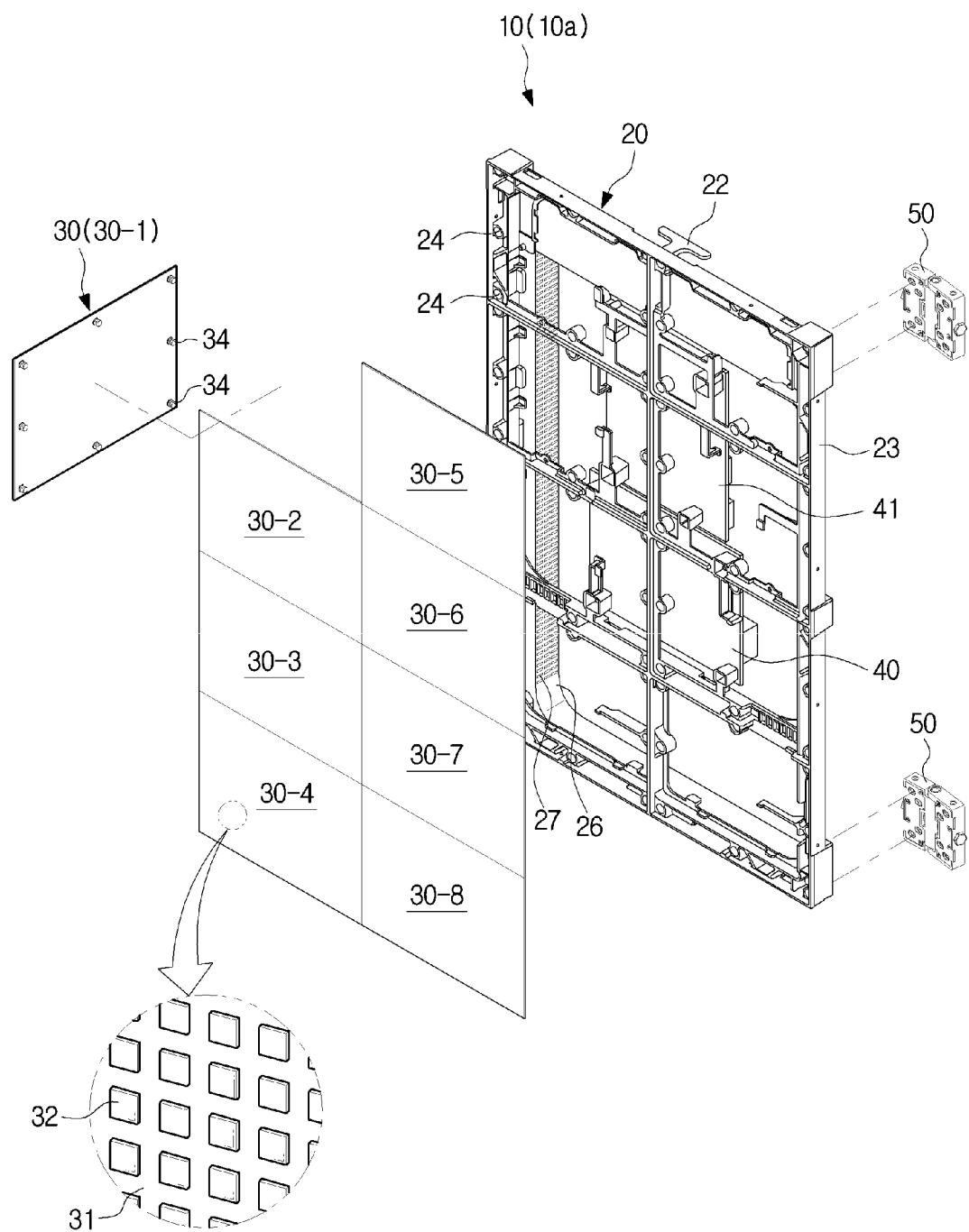
FIG. 3 illustrates a display module in FIG. 1.

FIG. 1 is a perspective view illustrating an outer appearance of a display apparatus according to an embodiment of the present disclosure. FIG. 2 is a rear view of the display apparatus in FIG. 1. FIG. 3 illustrates a display module in FIG. 1.

Referring to FIGS. 1 to 3, a display apparatus 1 is an apparatus that displays information, materials, data, and the like as characters, figures, graphs, images, and the like, and may include an advertising panel, an electronic display, a screen, a television, a monitor, and the like. The display apparatus 1 may be installed indoors or outdoors by a stand (not shown) or may be installed on a wall through a wall mount (not shown).

The display apparatus 1 may include a plurality of display modules 10 and a hinge assembly 50 connecting the plurality of display modules 10 to each other. In the present embodiment, the display apparatus 1 is composed of three of display modules 10a to 10c, but is not limited thereto, and the number of display modules 10 is not limited.

The plurality of display modules 10 may be continuously connected to each other in the left and right directions. The plurality of display modules 10 may be connected to each other in parallel, and may be connected to be curved in a concave shape toward the front when viewed from the top of the display apparatus 1 as illustrated in FIG. 1. Conversely, the plurality of display modules 10 may be connected to be curved in a convex shape toward the front when viewed from the top of the display apparatus 1, or may be connected to alternately form a concave shape and a convex shape.

That is, the screen itself of the display module 10 is flat, but the display apparatus 1 may be implemented to have a curved screen by adjusting an angle between the plurality of display modules 10 when the plurality of display modules 10 are connected.

As illustrated in FIG. 2, the hinge assembly 50 connecting the plurality of display modules 10 to each other may be coupled to a rear corner portion of the display module 10.

As illustrated in FIG. 3, the display module 10 may be composed of at least one LED module 30 and a cabinet 20 in which the at least one LED module 30 is installed. In the present embodiment, the display module 10 includes eight of LED modules 30-1 to 30-8 arranged as 4*2 matrices, but the number or arrangement of the LED modules 30 is not limited. Each of the LED modules 30 may be independently installed in or separated from the cabinet 20.

As such, by installing a plurality of LED modules 30 in the cabinet 20 by tiling in the form of a matrix in front, rear, left and right, a large-sized screen may be implemented using the small-sized LED module 30. Also, by connecting the plurality of display modules 10 composed of the plurality of LED modules 30 to each other by the hinge assembly 50, a larger sized screen may be implemented.

The LED module 30 may include a plurality of LEDs 32 as a light source and a substrate 31 on which the plurality of LEDs 32 is mounted. The plurality of LEDs 32 may be arranged at regular intervals from each other. An installation member 34 for installing the LED module 30 in the cabinet 20 may be provided on a rear surface of the LED module 30.

The cabinet 20 may include a support frame 23 forming a skeleton to support the LED module 30 and a rear plate 26 coupled to a rear surface of the support frame 23. The support frame 23 may be provided with a handle 22 for holding and transporting the cabinet 20 by hand.

The LED module 30 is installed on a front surface of the support frame 23, and an installation groove 24 into which the installation member 34 of the LED module 30 is inserted may be formed on the support frame 23. The installation member 34 may be securely fixed through a magnet member (not shown) or the like after being inserted into the installation groove 24.

A power source 41 for supplying power to the LED module 30 and a control board 40 for controlling the operation of the LED module 30 may be installed on the rear surface of the support frame 23. The rear plate 26 may be coupled to the rear surface of the support frame 23 to protect the power source 41 and the control board 40. A slit 27 for dissipating heat inside the cabinet 20 may be formed on the rear plate 26.

Figure 4:
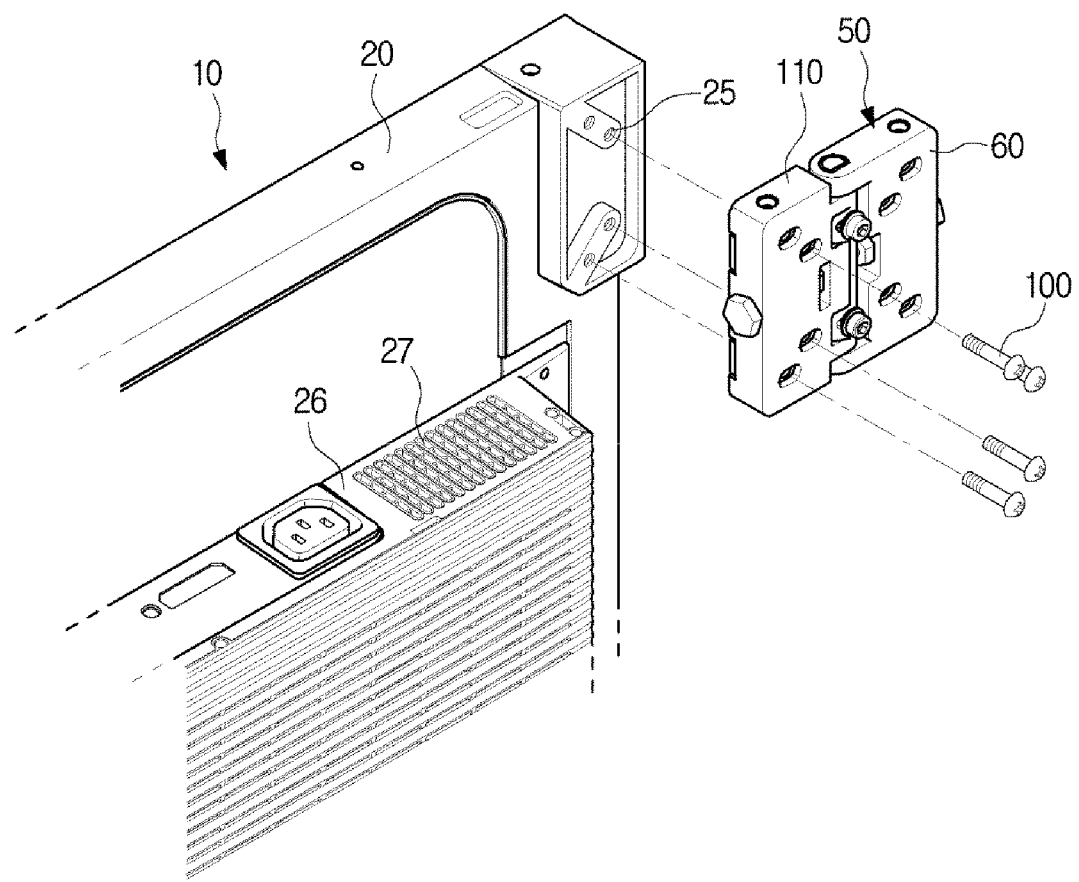
FIG. 4 illustrates a coupling structure of the display module and a hinge assembly in FIG. 1.
Figure 5:
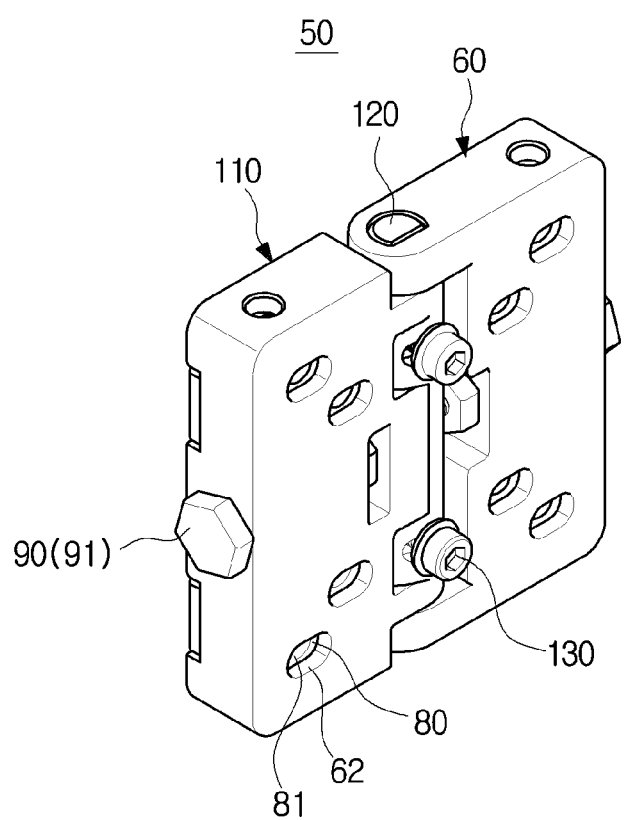
FIG. 5 is a perspective view of the hinge assembly in FIG. 1.
Figure 6:
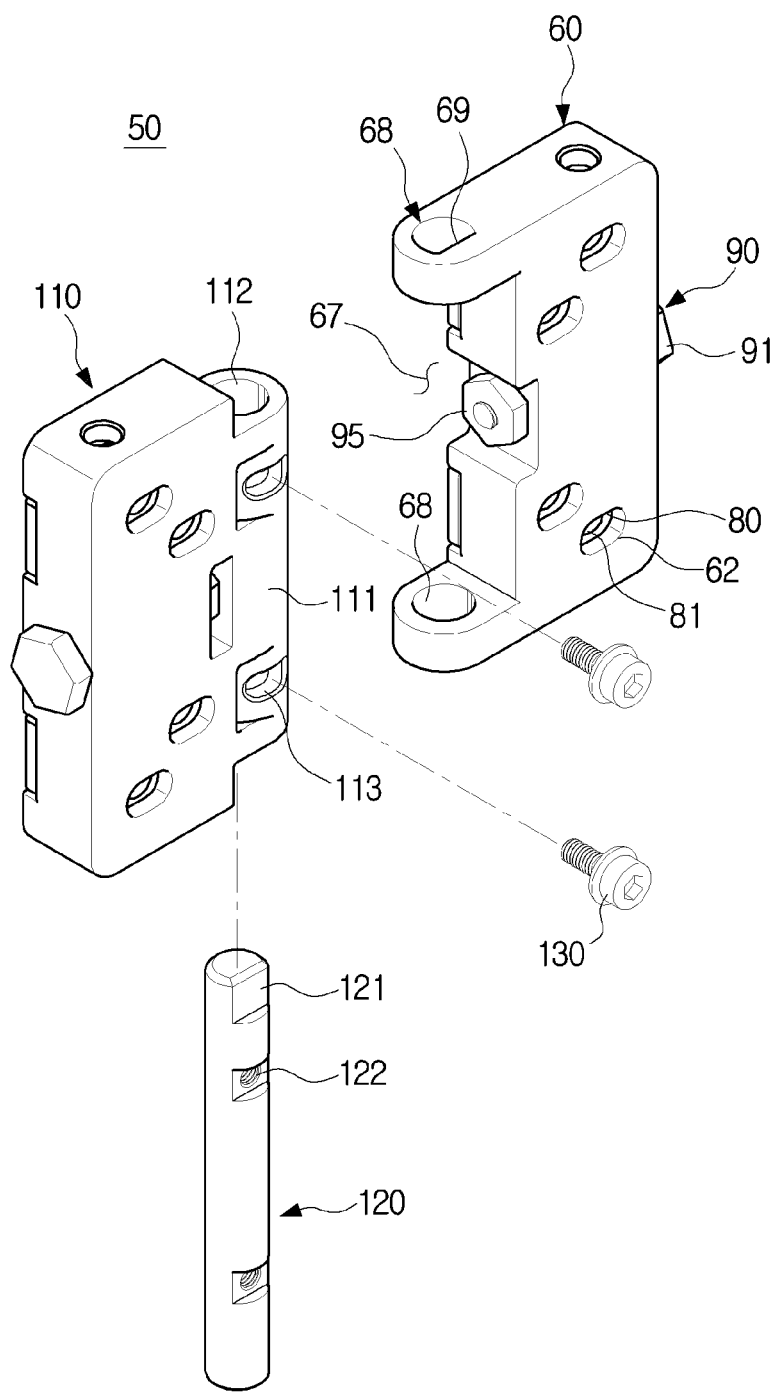
FIG. 6 is an exploded view of a pair of brackets and a hinge pin of the hinge assembly in FIG. 1.

FIG. 4 illustrates a coupling structure of the display module and a hinge assembly in FIG. 1. FIG. 5 is a perspective view of the hinge assembly in FIG. 1. FIG. 6 is an exploded view of a pair of brackets and a hinge pin of the hinge assembly in FIG. 1.

As illustrated in FIG. 4, the hinge assembly 50 for connecting the plurality of display modules 10 to each other may be coupled to the rear corner portion of the display module 10. Specifically, at least one coupling hole 25 is formed at a rear corner portion of the cabinet 20, and the hinge assembly 50 may include a long hole 62 and a coupling hole 81 which are formed at a position corresponding to the coupling hole 25.

The hinge assembly 50 may be coupled to the cabinet 20 through a separate coupling member 100. The coupling member 100 may be fastened to the coupling hole 81 and the coupling hole 25 through the long hole 62.

As illustrated in FIGS. 5 and 6, the hinge assembly 50 may include a pair of brackets 60 and 110 rotatably coupled to each other, and a pair of moving blocks 80 mounted on the pair of brackets 60 and 110, respectively.

The hinge assembly 50 may further include a hinge pin 120 to rotatably couple the pair of brackets 60 and 110 to each other. The first bracket 60 may include a hinge accommodating portion 67, and the second bracket 110 may include a hinge portion 111 accommodated in the hinge accommodating portion 67.

A hinge hole 68 and a hinge hole 112 into which the hinge pin 120 is inserted may be formed on the first bracket 60 and the second bracket 110, respectively. In a state where the hinge portion 111 of the second bracket 110 is inserted into the hinge accommodating portion 67 of the first bracket 60, the hinge hole 68 of the first bracket 60 and the hinge hole 112 of the second bracket 110 may be positioned to correspond to each other, and the hinge pin 120 may be inserted into the hinge hole 68 and the hinge hole 112.

The hinge pin 120 may include an interlocking portion 121 to rotate the first bracket 60 together when the hinge pin 120 rotates, and the hinge hole 68 of the first bracket 60 may be provided with a locking portion 69 caught in the interlocking portion 121.

A hinge screw 130 may be fastened to the hinge pin 120 to prevent the hinge pin 120 from being separated from the brackets 60 and 110 and to limit the rotation range of the first bracket 60 and the second bracket 110. To this end, a fastening hole 122 may be formed on the hinge pin 120, and an angle limiting portion 113 through which the hinge screw 130 penetrates may be formed on the hinge portion 111. The angle limiting portion 113 may extend along a circumferential direction of the hinge pin 120 in order to prevent the hinge pin 120 from being separated in a vertical direction and at the same time to limit the rotation range of the first bracket 60 and the second bracket 110 to a certain range.

As such, because the pair of brackets 60 and 110 are rotatably coupled based on the hinge pin 120, the hinge assembly 50 may connect the plurality of display modules 10 to each other such that the angle between the plurality of display modules 10 may be varied.

The moving block 80 may be coupled to the display module 10 and may be configured to be slidingly movable with respect to the brackets 60 and 100 on which the moving block 80 is mounted. Because the moving block 80 is coupled to the display module 10, when the moving block 80 slidingly moves, the display module 10 may also slidingly move.

As a result, the moving block 80 may adjust a spacing between the plurality of display modules 10. Accordingly, the plurality of display modules 10 may rotate smoothly without interfering with each other, and the gap between the plurality of display modules 10 generated according to the angle between the plurality of display modules 10 may be eliminated.

The hinge assembly 50 may further include a spacing adjustment member 90 configured to adjust the position of the moving block 80. The spacing adjustment member 90 may include a screw 91 screwed to the moving block 80, and a separation preventing nut 95 coupled to the screw 91 to prevent the screw 91 from being separated. When the user manually rotates the screw 91, the moving block 80 may slide. The specific configuration of the spacing adjustment member 90 will be described further below.

The configuration of the first bracket 60 and the configuration of the second bracket 110 are substantially the same except for the hinge accommodating portion 67 and the hinge portion 111. Therefore, hereinafter, only the first bracket 60 will be described, the description of the second bracket 110 will be omitted, and the first bracket 60 may be simply referred to as the bracket 60.

Figure 7:
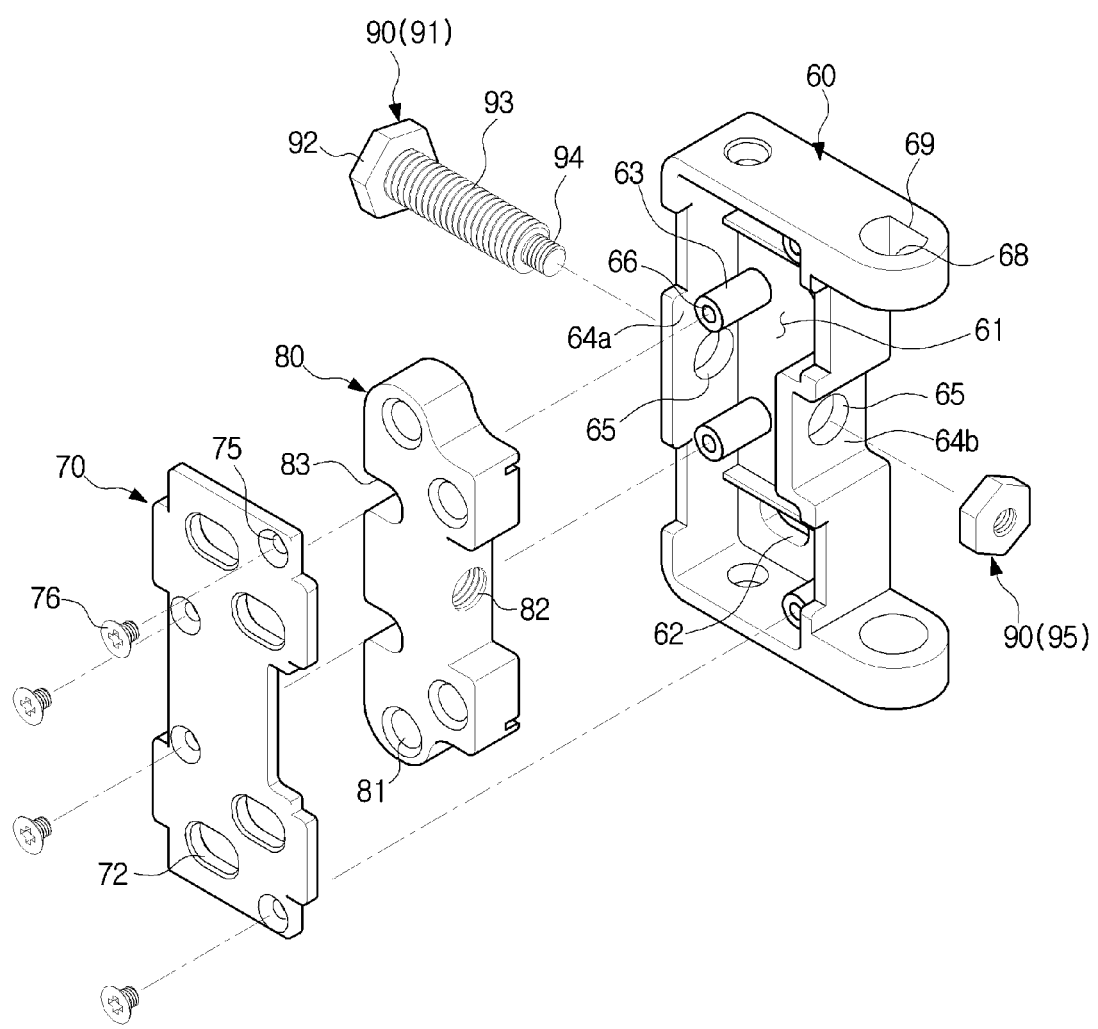
FIG. 7 illustrates a bracket, a moving block, and a spacing adjustment member in FIG. 1.
Figure 8:
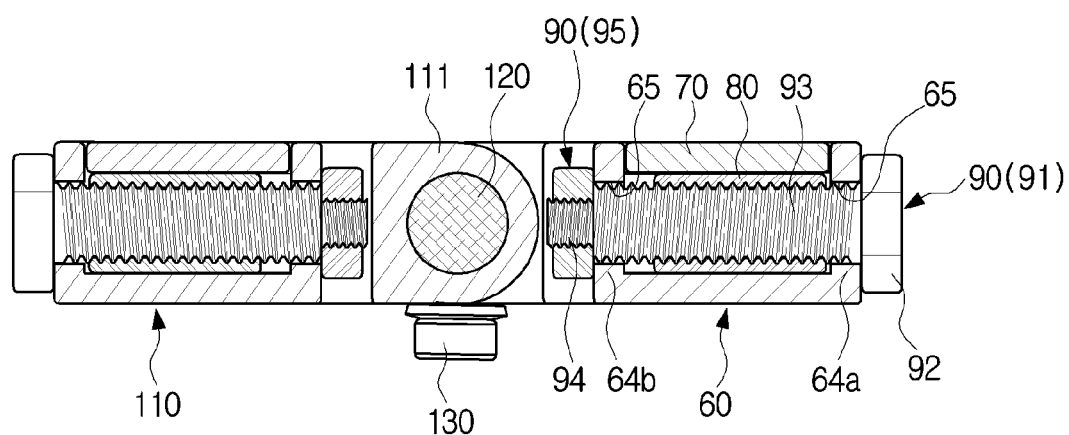
FIG. 8 is a plan cross-sectional view of the hinge assembly in FIG. 1.

FIG. 7 illustrates a bracket, a moving block, and a spacing adjustment member in FIG. 1. FIG. 8 is a plan cross-sectional view of the hinge assembly in FIG. 1.

Referring to FIGS. 7 and 8, the bracket 60 may include a mounting portion 61 to which the moving block 80 is movably mounted, the long hole 62 through which the coupling member 100 coupling the moving block 80 to the display module 10 penetrates, a guide protrusion 63 guiding the movement of the moving block 80, and separation preventing walls 64a and 64b preventing separation of the spacing adjustment member 90.

The mounting portion 61 may be provided with an open side such that the moving block 80 may be mounted and detached, and a cover 70 may be coupled to the open side. To this end, a fastening hole 66 and a fastening hole 75 are formed on the bracket 60 and the cover 70, respectively, and a fastening screw 76 is fastened to the fastening hole 66 and fastening hole 75, so that the cover 70 may be coupled to the bracket 60.

The long hole 62 may extend along a moving direction of the coupling member 100 so that the coupling member 100 coupling the moving block 80 to the display module 10 may be moved. A long hole 72 corresponding to the long hole 62 of the bracket 60 may also be formed on the cover 70.

The guide protrusion 63 may limit the moving block 80 from moving in the vertical direction and guide the moving block 80 to move in a horizontal direction. The guide protrusion 63 may be inserted into a guide groove 83 of the moving block 80. The guide groove 83 may extend in the horizontal direction.

The separation preventing wall 64a and the separation preventing wall 64b may prevent the spacing adjustment member 90 from being separated from the bracket 60. Screw insertion holes 65 into which the screw 91 is inserted may be formed on the separation preventing wall 64a and the separation preventing wall 64b, respectively.

The spacing adjustment member 90 may include a screw 91 screwed to the moving block 80, and a separation preventing nut 95 coupled to the screw 91 to prevent separation of the screw 91. The screw 91 may include a head portion 92 having a larger diameter than the screw insertion hole 65, a male thread portion 93 with threads formed on an outer circumferential surface thereof, and a nut coupling portion 94 formed at an end of the male screw portion 93 such that the separation preventing nut 95 is coupled.

The moving block 80 may include the coupling hole 81 to which the coupling member 100 is fastened so as to be coupled to the display module 10, and a female thread portion 82 with threads formed on an inner circumferential surface thereof so as to be screwed to the male thread portion 83 of the screw 91.

With this configuration, when the spacing adjustment member 90 is rotated in a state where the moving block 80 and the spacing adjustment member 90 are screwed, a rotational movement of the spacing adjustment member 90 is converted to a linear movement of the moving block 80, so that the moving block 80 may slidingly move left or right in the horizontal direction.

Figure 9:
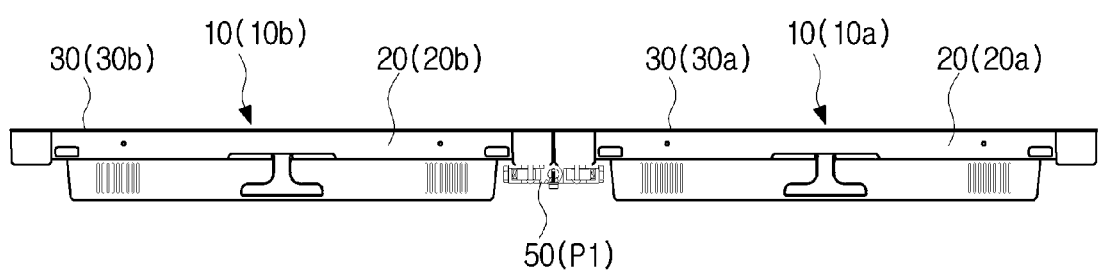
FIG. 9 is a plan view of the display apparatus when the hinge assembly in FIG. 1 is in a basic position.
Figure 10:
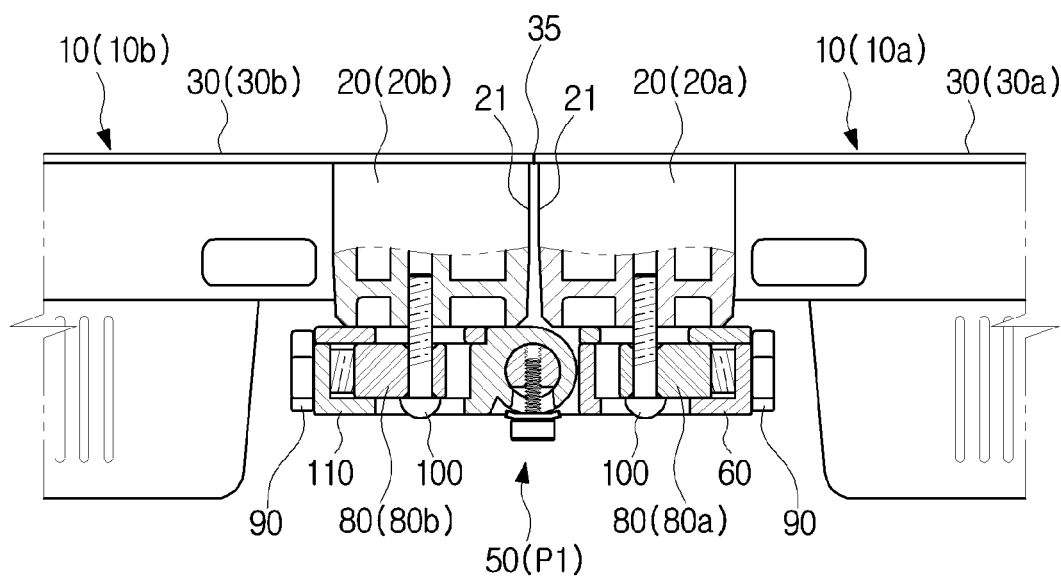
FIG. 10 is an enlarged plan cross-sectional view of the vicinity of the hinge assembly in FIG. 9.
Figure 11:
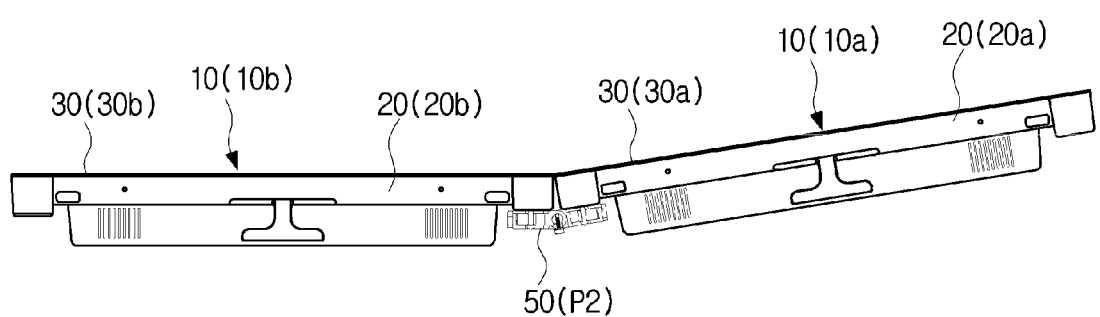
FIG. 11 is a plan view of the display apparatus when the hinge assembly in FIG. 1 is in a concave position.
Figure 12:
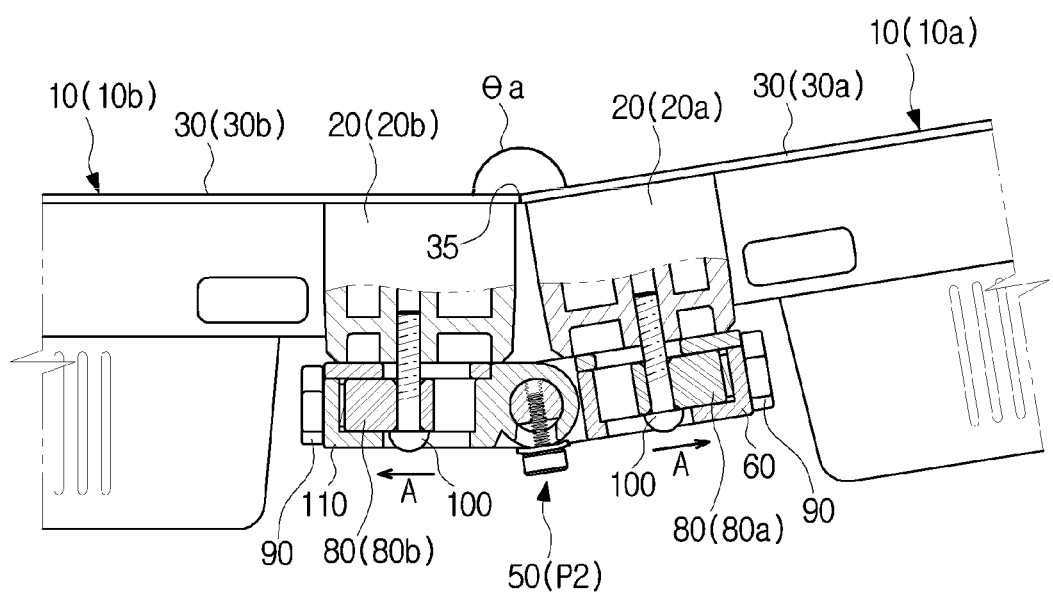
FIG. 12 is an enlarged plan cross-sectional view of the vicinity of the hinge assembly in FIG. 10.
Figure 13:
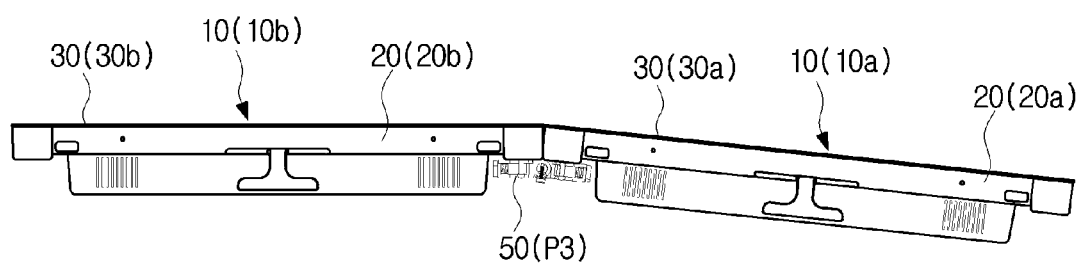
FIG. 13 is a plan view of the display apparatus when the hinge assembly in FIG. 1 is in a convex position.
Figure 14:
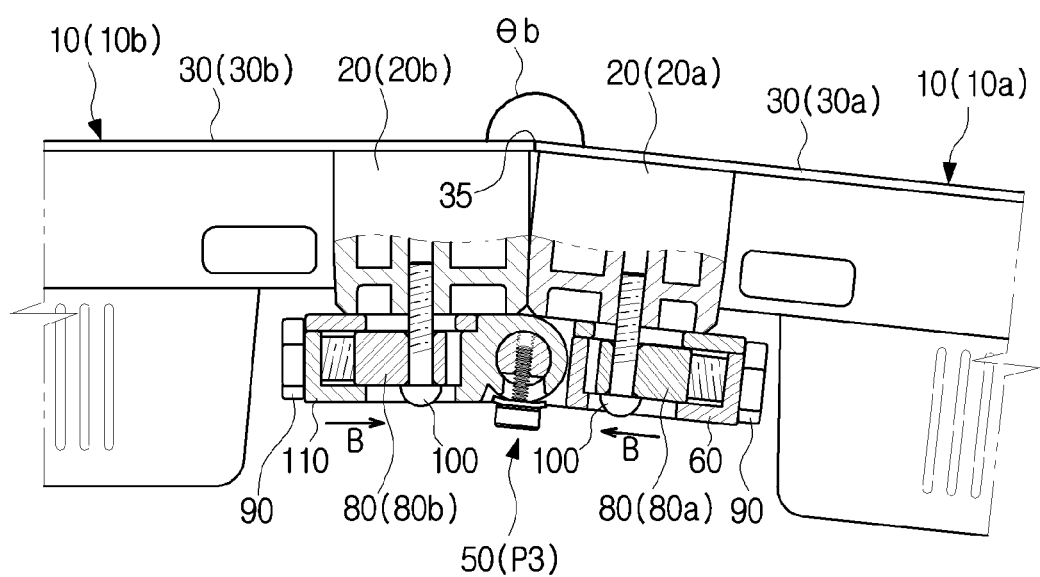
FIG. 14 is an enlarged plan cross-sectional view of the vicinity of the hinge assembly in FIG. 13.

FIG. 9 is a plan view of the display apparatus when the hinge assembly in FIG. 1 is in a basic position. FIG. 10 is an enlarged plan cross-sectional view of the vicinity of the hinge assembly in FIG. 9. FIG. 11 is a plan view of the display apparatus when the hinge assembly in FIG. 1 is in a concave position. FIG. 12 is an enlarged plan cross-sectional view of the vicinity of the hinge assembly in FIG. 10. FIG. 13 is a plan view of the display apparatus when the hinge assembly in FIG. 1 is in a convex position. FIG. 14 is an enlarged plan cross-sectional view of the vicinity of the hinge assembly in FIG. 13.

Referring to FIGS. 9 and 10, when the hinge assembly 50 is in a reference position P1, that is, when an angle between the pair of brackets 60 and 110 is 180 degrees, an angle between the plurality of display modules 10a and 10b connected by the hinge assembly 50 may be 180 degrees. Specifically, an angle between the LED module 30a of the display module 10a and the LED module 30b of the display module 10b may be 180 degrees. That is, a screen of the display module 10a and a screen of the display module 10b may be located on the same plane.

Facing surfaces of the cabinet 20a of the display module 10a and the cabinet 20b of the display module 10b may have inclined surfaces 21 that get gradually away from each other toward the hinge assembly 50 side, respectively. By the inclined surfaces 21, a gap may not be generated between the LED module 30a and the LED module 30b even in a convex position P2 in FIGS. 13 and 14, which will be described later, and the LED module 30a and the LED module 30b may be in contact with each other at a contact point 35.

Referring to FIGS. 11 and 12, when the hinge assembly 50 is in a concave position P2, that is, when the angle between the pair of brackets 60 and 110 is less than 180 degrees, the angle between the plurality of display modules 10a and 10b connected by the hinge assembly 50 may be an angle θa less than 180 degrees.

In this case, the moving blocks 80a and 80b may slidingly move so that the display module 10a and the display module 10b are rotatable without interfering with each other. That is, the moving block 80a and the moving block 80b slidingly move in a direction A of getting away from each other, so that the display module 10a and the display module 10b may rotate smoothly without interfering with each other.

Referring to FIGS. 13 and 14, when the hinge assembly 50 is in a convex position P2, that is, when the angle between the pair of brackets 60 and 110 is more than 180 degrees, the angle between the plurality of display modules 10a and 10b connected by the hinge assembly 50 may be an angle θb more than 180 degrees.

The moving blocks 80a and 80b may slidingly move so that a gap is not generated between the display module 10a and the display module 10b when the display module 10a and the display module 10b rotate. That is, the moving block 80a and the moving block 80b slidingly move in a direction A of getting close to each other each other, so that a gap may not be generated between the display module 10a and the display module 10b. Therefore, a seam between the display module 10a and the display module 10b may be prevented from being viewed, and the image quality may be improved by keeping a pitch between the LEDs constant.

While the present disclosure has been particularly described with reference to exemplary embodiments, it should be understood by those of skilled in the art that various changes in form and details may be made without departing from the spirit and scope of the present disclosure.

The invention claimed is:
1. A display apparatus comprising:
a first display module;
a second display module; and
a hinge assembly connecting the first display module and the second display module the hinge assembly including:
a first bracket,
a second bracket coupled to the first bracket so that the first bracket and the second bracket are rotatable relative to each other to adjust an angle between the first display module and the second display module,
a first moving block mounted on the first bracket and coupled to the first display module, and
a second moving blocks mounted on the second bracket and coupled to the second display module,
wherein the first moving block is configured to slidingly move with respect to the first bracket, and the second moving block is configured to slidingly move with respect to the second bracket, to adjust a spacing between the first display module and the second display module.
2. The display apparatus according to claim 1, wherein the hinge assembly further includes a hinge pin coupling the first bracket and the second bracket.

3. The display apparatus according to claim 1, wherein the hinge assembly further includes:
   a first spacing adjustment member to adjust a position of the first moving block, and
   a second spacing adjustment member to adjust a position of the second moving block.

4. The display apparatus according to claim 3, wherein the first spacing adjustment member includes a first screw screwed to the first moving block,
   the second spacing adjustment member includes a second screw screwed to the second moving block,
   the first moving block slidingly moves when the first screw rotates, and
   the second moving block slidingly moves when the second screw rotates.

5. The display apparatus according to claim 4, wherein the hinge assembly includes:
   a first separation preventing nut coupled to the first screw to prevent the first screw from being separated, and
   a second separation preventing nut coupled to the second screw to prevent the second screw from being separated.

6. The display apparatus according to claim 1, wherein the first bracket includes a first mounting portion on which the first moving block is mounted to slidingly move, and
   the second bracket includes a second mounting portion on which the second moving block is mounted to slidingly move.

7. The display apparatus according to claim 6, wherein the first mounting portion has an open side through which the first moving block is entered to be mounted on the first mounting portion, and
   the second mounting portion has an open side through which the second moving block is entered to be mounted on the second mounting portion.

8. The display apparatus according to claim 7, wherein the hinge assembly includes:
   a first cover coupled to the first bracket to cover the open side of the first mounting portion, and
   a second cover coupled to the second bracket to cover the open side of the second mounting portion.

9. The display apparatus according to claim 1, wherein the hinge assembly includes:
   a first coupling member to couple the first moving block to the first display module, and
   a second coupling member to couple the second moving block to the second display module.

10. The display apparatus according to claim 9, wherein the first bracket includes a first long hole extending along a moving direction of the first moving block, and through which the first coupling member penetrates, and
    the second bracket includes a second long hole extending along a moving direction of the second moving block, and through which the second coupling member penetrates.

11. The display apparatus according to claim 1, wherein the first bracket includes a first guide protrusion to guide movement of the first moving block, and
    the second bracket includes a second guide protrusion to guide movement of the second moving block.

12. The display apparatus according to claim 1, wherein the first bracket and the second bracket are rotatable relative to one another so that an angle between screens of the first display module and screens of the second display module is less than 180 degrees.

13. The display apparatus according to claim 12, wherein when the first bracket and the second bracket are rotated so that an angle between the screens of the first display module and the screens of the second display module is less than 180 degrees, the first moving block and the second moving block each move in a direction away from a rotation axis of the first bracket and the second bracket.

14. The display apparatus according to claim 1, wherein the first bracket and the second bracket are rotatable relative to one another so that an angle between screens of the first display module and screens of the second display module is more than 180 degrees.

15. The display apparatus according to claim 14, wherein when the first bracket and the second bracket are rotated so that an angle between the screens of the first display module and the screens of the second display module is more than 180 degrees, the first moving block and the second moving block each move in a direction toward a rotation axis of the first bracket and the second bracket.

16. A display apparatus comprising:
    a plurality of display modules; and
    a hinge assembly connecting the plurality of display modules,
    wherein the hinge assembly includes:
       a pair of brackets rotatably coupled to each other to adjust an angle between the plurality of display modules,
       a moving block is mounted on each of the pair of brackets to be coupled to the display module, the moving block configured to slidingly move with respect to the bracket to adjust a spacing between the plurality of display modules, and
       a spacing adjustment member to adjust a position of the moving block,
    wherein the spacing adjustment member includes a screw screwed to the moving block, and
    the moving block slidingly moves when the screw rotates.

17. The display apparatus according to claim 16, wherein the hinge assembly includes a separation preventing nut coupled to the screw to prevent the screw from being separated.

* * * * *